Sept. 1, 1964          H. M. MELZER          3,146,773
COLLAPSIBLE PORTABLE GRILL
Filed July 3, 1962          2 Sheets-Sheet 1
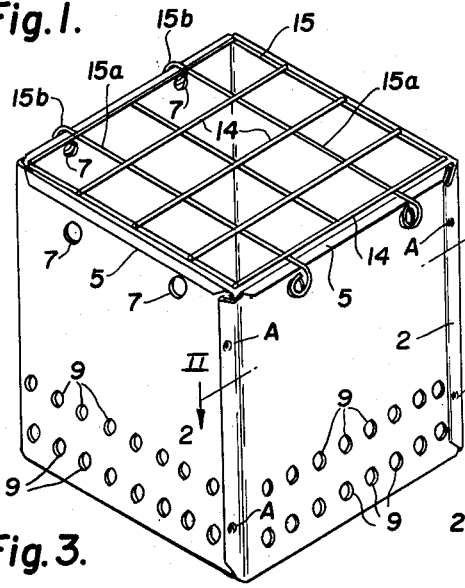
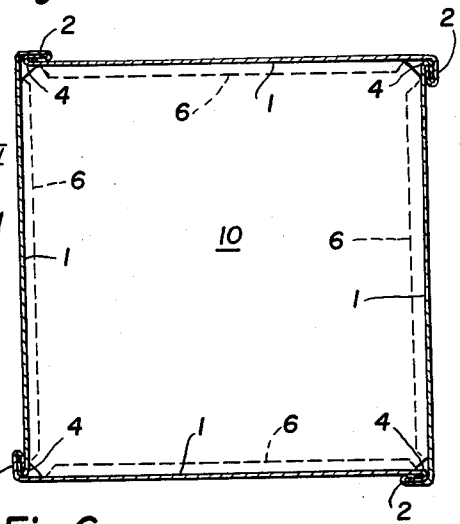
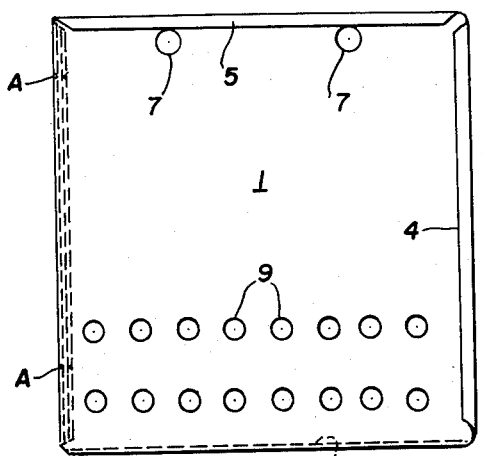
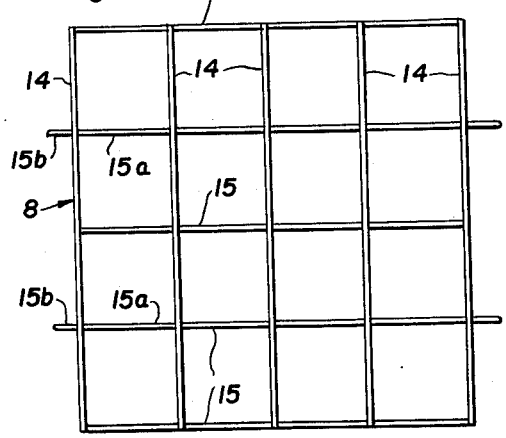
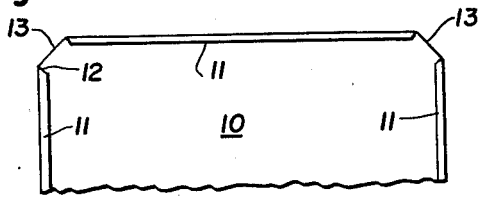
INVENTOR.
HERMAN M. MELZER
BY
his ATTORNEYS Sept. 1, 1964
H. M. MELZER
3,146,773
COLLAPSIBLE PORTABLE GRILL
Filed July 3, 1962
2 Sheets-Sheet 2
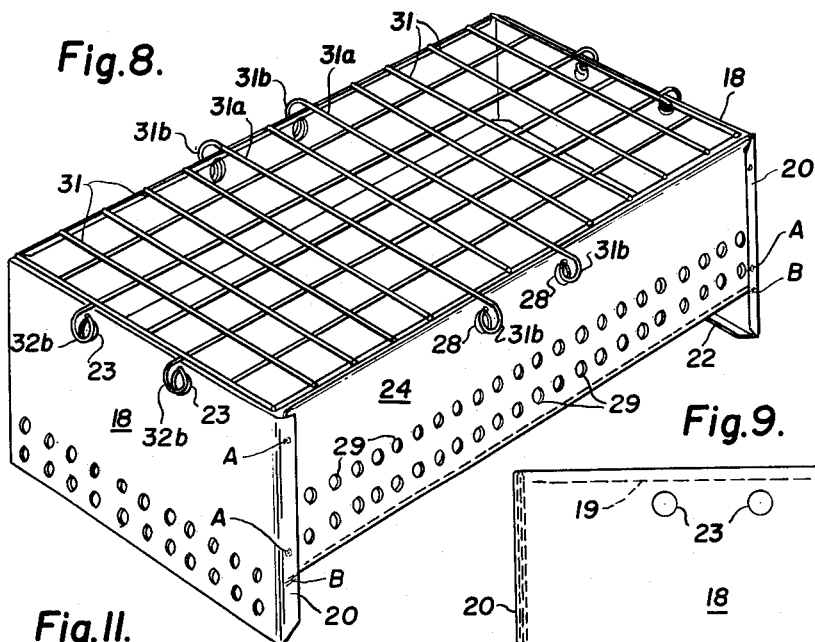
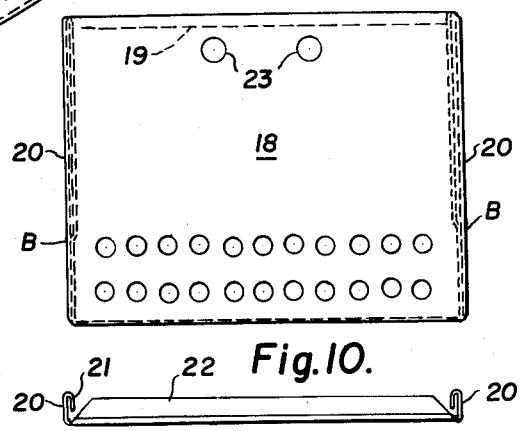
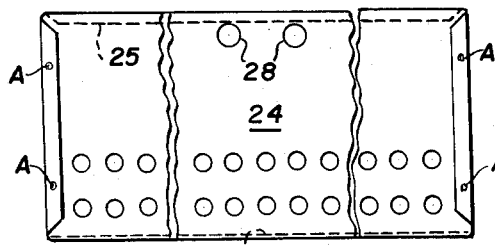
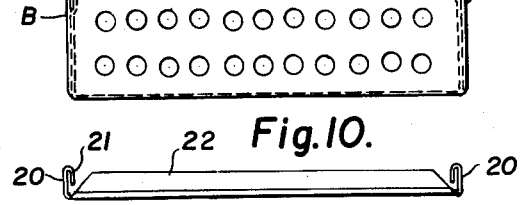
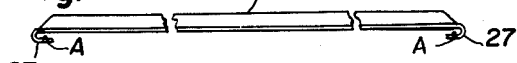
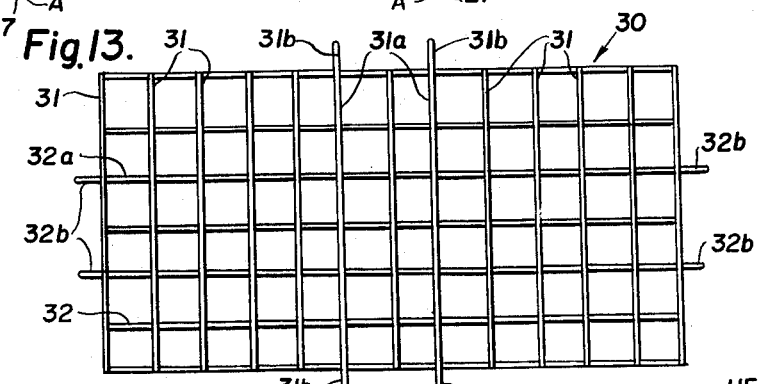
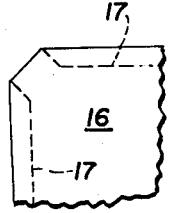
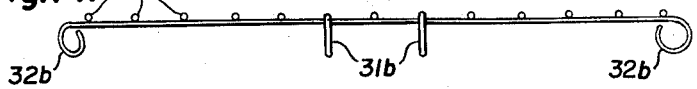
INVENTOR.
HERMAN M. MELZER
his ATTORNEYS

United States Patent Office 3,146,773
Patented Sept. 1, 1964

3,146,773
COLLAPSIBLE PORTABLE GRILL
Herman M. Melzer, 2109 Gordon Ave., McKeesport, Pa.
Filed July 3, 1962, Ser. No. 207,229
5 Claims. (Cl. 126—9)

The present invention pertains to portable grills for use in outdoor preparation of foods. The invention further pertains to grills of the type which may be collapsed into a flat package for storage and transportation, then readily reassembled for use.

Outdoor cooking by campers, picnickers and motorists has increased greatly by reason of the increased emphasis being placed upon recreational activities. Elaborate facilities for this purpose are frequently an outdoor accessory to some homes, parks and infrequently at picnic grounds. Portable facilities now available on the market are quite elaborate and too bulky for convenient storage or transportation by automobile, boat or canoe.

One object of the present invention is to provide a light weight self-sustaining grill which may be folded into a flat package for transportation, readily assembled for use and disassembled again for storage.

Another object of the invention is to provide a grill of the type described employing charcoal, briquettes and similar fuel for heating purpose.

A further object of the invention is to provide a grill of the type which may be placed upon any suitable surface without danger of damaging said surface by the heat employed in preparing the food.

These and other objects of the invention will be made apparent from the following description and the drawing forming a part thereof wherein:

FIG. 1 shows a perspective view of one form of the assembled grill;

FIG. 2 shows a horizontal cross-section taken on lines II—II of FIG. 1;

FIG. 3 shows a detail elevational view of the grill side wall;

FIG. 4 shows an edge view of the side wall of FIG. 3;

FIG. 5 shows a partial plan view of the grill bottom wall;

FIG. 6 shows a plan view of the grid forming the grill top wall;

FIG. 7 shows an edge view of said grid;

FIG. 8 shows a perspective view of a modified form of grill;

FIG. 9 shows an elevational view of the grill end wall;

FIG. 10 shows an edge view of the end wall;

FIG. 11 shows an elevational view of the grill side wall;

FIG. 12 shows an edge view of the grill side wall;

FIG. 13 shows a plan view of the grid forming the grill top wall;

FIG. 14 shows an edge view of the grid; and

FIG. 15 shows a partial plan view of the grill bottom wall.

Referring now to one form of the invention as exemplified in FIGS. 1 to 7 of the drawing, it will be noted that the assembled grill is substantially square. It will be understood that the grill may be of any desired size and may be either square or rectangular. Thus all vertical walls may be of the same size or two parallel side walls may be made longer than the width of the parallel end walls.

Assuming first that all vertical walls of the grill are of the same height and width, such a wall is shown in FIGS. 3 and 4. Here a plate 1 is provided with an inwardly facing vertical side flange 2 which terminates in a re-entrant flange portion 3 disposed in spaced relation to flange 2. Crimps A are placed in either or both flanges 2 and 3 to partially close the space therebetween as a frictional locking means. On the opposite side of plate 1 is a re-entrant outwardly disposed flange 4 extending substantially parallel with plate 1. Extending longitudinally of the top edge of plate 1 is preferably a reinforcing bead 5 which may be folded 180° upon itself. Extending longitudinally of the bottom edge is an inwardly extending flange 6 which is preferably at 90° to plate 1. As shown in FIG. 3, the terminal edges of flanges 2, 4 and 6 are preferably chamfered (as shown) for ease in assembly of the grill. Within the body of plate 1, adjacent bead 5, are a pair of spaced openings 7 for attachment or retention of the top grid 8 as hereinafter discussed. Adjacent the bottom of plate 1 may be a suitable number of suitably spaced openings 9 providing for entrance of combustion air and may also be spaced for decorative purposes.

As shown in FIGS. 5 and 2, a bottom plate 10 is provided with marginal beads 11 preferably formed by bending a portion of plate 10 about 180° upon itself. Each bead has its end edges chamfered as at 12 and the corners of plate 10 are also chamfered as at 13 for ease of assembly and non-interference with the locking flanges 2, 3 and 4, hereinafter discussed. As shown in FIGS. 6 and 7, a wire grid forms the top wall of the grill. As shown, suitably spaced longitudinally and transversely extending wires 14 and 15 are secured, as by welding, to serve as a surface to support food or containers for food placed thereon for heating. One or more of said transverse wires 15a are preferably extending beyond the outer transverse wires 14 and terminate in arcuate portions 15b. One such arcuate portion 15b of the wires may be hooked into openings 7 of one plate 1 for the purpose of hinging the grid 8 to a wall 1 to retain the grid in place during use. The other of arcuate portion 15b may be disposed to overlap the adjacent plate 1 and be partially removably received in the adjacent opening 7 of plate 1 to retain the grill in place and to permit raising the grid for insertion of combustible fuel such as charcoal briquettes or other suitable material upon bottom plate 10 of the assembled grill.

As shown in FIGS. 1 and 2, when the vertical flanges 2, 3 and 4 of plates 1 are inter-engaged, in a vertical direction, they form in effect lock seams preventing lateral displacement. The crimps A in flanges 2 and 3 serve to create frictional resistance to movement of flange 4 therebetween. Due to the disposition of the flanges at opposite vertical corners of plates 1 these flanges impart sufficient rigidity to the grill, after bottom plate 10 is inserted therewithin upon the flanges 6 to retain the grill members in assembled relation independently of the grid 8. Any suitable fuel disposed upon plate 10 and ignited provides sufficient heat to prepare desired food upon grid 8. Such openings 9, in plates 1, provide a suitable updraft of air through the grid 8 to facilitate heating of articles upon grid 8. It is to be noted, however, that the presence of holes 9 is not considered mandatory.

Preferably the grill is formed of aluminum or stainless steel to resist corrosion and for rapid heating. The grill members may be of any suitable light gauge of metal. After the food is cooked or heated and it is desired to collapse the grill for storage, the grid 8 may be released from one side of the grill and hinged back for ease in discharging all ashes and unconsumed fuel which remains upon bottom plate 10. After the grill is cooled for safe handling, the bottom plate 10 may be pushed upwardly free of plates 1 and thereafter plates 1 may be separated by applying a slight force in opposite directions upon adjacent side walls. The disassembled plates 1 may then be stacked along with grid 8 to make a compact flat package, to be stored for future use.

Referring now to the modified form of grill as shown in FIGS. 8 to 15 of the drawing, the grill rectangular bottom wall 16 receiving the combustible fuel is shown as disposed in vertical spaced relation to the surface upon which the grill is disposed. Preferably wall 16 has a marginal portion thereof folded 180° upon the body of 16 to provide rigidifying beads 17.

The opposite end walls 18 of the grill are composed of a plate body having a top marginal edge folded 180° upon itself providing a rigidifying bead 19. At each vertical side margin of each end wall 18 is provided a right-angled flange 20 terminating in re-entrant flange 21 disposed in spaced fashion to flange 20. Crimps A in flanges 20, 21 serve to partially close the spacing between the flanges to provide additional frictional resistance. Crimp B completely closes flange 21 upon 20 to act as a stop for side wall 24 to position the upper edges of the side and end walls in a single horizontal plane. The bottom margin of wall 18 is provided with a right-angled flange 22 engaging the surface upon which the grill is supported. Adjacent each end wall bead 19 are one or more openings 23 in plate 18 for a purpose hereinafter discussed.

Each opposite side wall 24 of the grill has a bead 25 at the top longitudinal edge thereof similar to bead 19. The vertical height of side wall 24 is preferably less than that of end wall 18 and has its bottom longitudinal edge defined by an inturned preferably 90° flange 26 for support of bottom wall 16. Each vertical edge of each side wall 24 is provided with a reentrant flange 27 having therein friction creating crimps A as previously discussed. Intermediate the ends of each side wall 24 and adjacent the top edge thereof may be one or more openings 28 in the side wall for a purpose to be hereinafter discussed. Adjacent the bottom flange 26 and extending longitudinally of side wall 24 may be a plurality of openings 29 through the side wall. These openings may be used to admit combustion air to fuel upon bottom wall 16.

A top wall or grid 30 overlies the end and side walls 18 and 24, providing support for food to be prepared or containers for such food. Such grid is comprised of transversely and longitudinally spaced wire members 31 and 32 suitably secured together as by welding. Preferably two of the longitudinally extending and transversely spaced wire members 32a are longer than the wires 31 and are provided with looped end portions 31b. One such pair of portions 32b at one end of the grid may be connected through the adjacent end wall openings 23 providing a hinged connection therewith.

Assembly of the grill of FIGS. 8 to 15 may be effected by engaging the bottom edge of one side wall flange 27 within the top edge of end wall re-entrant flange 20, 21, and sliding the side wall downwardly until the top edges of the side and end wall are flush and stop B on flanges 20, 21 prevents further movement of side wall 24. Similarly the opposite side wall 24 is connected to said end wall 18 and both said side walls 24 are thereafter so connected with the opposite end wall 18. The bottom wall 16 may then be placed between the side walls upon the bottom flanges 26 thereof, to impart rigidity to the grill. The grid 30 portions 32b at one end thereof may then be hinged to one end wall 18 and after the grid is disposed over said side and end walls the grid portions 31b and 32b embrace the side walls 24 and end walls 18 respectively to retain the grid in place.

I claim:

1. In a portable selectively self-sustaining and collapsible grill, the combination of,
    (a) side walls each comprised of a rectangular body portion having one vertical edge flanged rearwardly at right angles to the outer face of said body portion and terminating a re-entrant flange disposed in overlapping spaced relation to said first flange,
    (b) a second vertical edge of said sidewall body portion being provided with a flange turned inwardly over the outer face of the body portion and disposed in spaced relation thereto,
    (c) a flange on the bottom edge of the said side wall body portion extending rearwardly from the outer face of the body portion and providing support for a bottom wall,
    (d) a plurality of perforations extending through said body portion above said bottom flange,
    (e) said side walls being assembled together by slidably engaging adjacent vertical edge flanges thereof with each side wall bottom flange facing inwardly,
    (f) a rectangular bottom wall received upon said side wall bottom flanges and comprised of a body portion having each marginal edge thereof disposable closely adjacent one of said side walls for retaining the latter in substantially fixed relation to each other and the corners of said bottom wall body portion chamfered to prevent interference with said side wall flanges, and
    (g) a grid member overlying said assembled side walls providing passageways for escape of products of combustion from fuel disposed upon said bottom wall, said grid having a hinge connection to the top portion of one side wall and extending to overlie a face of the opposite side wall.

2. The grill as defined in claim 1 wherein at least one vertical flange of each side wall has a crimp therein providing frictional resistance to movement of the adjacent side wall flange received therein.

3. The grill as defined in claim 1 wherein said grid member embraces opposite side walls to restrict displacement thereof from rectangular configuration.

4. In a portable selectively self-sustaining and collapsible rectangular grill, the combination of
    oppositely disposed pairs of side and end walls each comprised of a rectangular body portion provided with suitable flanges at each vertical edge thereof for slidable engagement with the vertical edge flanges of the adjacent said walls,
    said end wall body portions being of greater vertical height than that of the side wall body portions,
    said end wall body portion vertical edge flanges having the bottom portions thereof closed to restrict passage of the side wall flanges so as to maintain the top edges of the side wall body portions in substantially the horizontal plane containing the end wall body portion top edges,
    an open mesh rectangular grid member supported upon the top edges of said side and end wall body portions,
    means at each edge of said grid member for overlapping the adjacent vertical body portions of said grill walls to retain the said walls in rectangular relation when the grid is supported upon the top edges of the said body portions thereof; and
    inturned bottom flanges upon said grill side walls providing a support for a bottom wall, and
    a rectangular grill bottom wall provided with marginal edges conforming to and disposed closely adjacent to said grill vertical walls providing rigidity thereto when disposed upon said grill side wall bottom flanges.

5. The grill as defined in claim 4, wherein said side wall body portions adjacent said bottom flanges thereof are provided with a plurality of perforations providing combustion air to fuel burned upon said grill botttom wall.

References Cited in the file of this patent

UNITED STATES PATENTS

| | | |
|---|---|---|
| 1,459,455 | Vago | June 19, 1923 |
| 1,466,343 | Rouse | Aug. 28, 1923 |

FOREIGN PATENTS

| | | |
|---|---|---|
| 107,037 | Great Britain | June 21, 1917 |
| 861,947 | Great Britain | Mar. 1, 1961 |

UNITED STATES PATENT OFFICE
CERTIFICATE OF CORRECTION

Patent No. 3,146,773                 September 1, 1964

Herman M. Melzer

It is hereby certified that error appears in the above numbered patent requiring correction and that the said Letters Patent should read as corrected below.

Column 3, line 11, for "fashion" read -- relation --.

Signed and sealed this 5th day of January 1965.

;EAL)
ttest:

RNEST W. SWIDER                         EDWARD J. BRENNER
:testing Officer                           Commissioner of Patents